US012784511B2

(12) United States Patent
Endo et al.

(10) Patent No.: US 12,784,511 B2
(45) Date of Patent: Nov. 3, 2026

(54) DRIVING DIAGNOSIS SYSTEM, DIAGNOSIS SERVER, AND USER INTERFACE SERVER

(71) Applicant: TOYOTA JIDOSHA KABUSHIKI KAISHA, Toyota (JP)

(72) Inventors: Masato Endo, Nagoya (JP); Shuhei Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 18/892,912

(22) Filed: Sep. 23, 2024

(65) Prior Publication Data

US 2025/0209864 A1 Jun. 26, 2025

(30) Foreign Application Priority Data

Dec. 20, 2023 (JP) ................................ 2023-214409

(51) Int. Cl.
*G07C 5/04* (2006.01)
*G07C 5/00* (2006.01)

(52) U.S. Cl.
CPC ............... *G07C 5/008* (2013.01); *G07C 5/04* (2013.01)

(58) Field of Classification Search
CPC ...... G05B 23/0262; G05B 2219/24065; G07C 5/008; G07C 5/04; G07C 5/808
See application file for complete search history.

(56) References Cited

U.S. PATENT DOCUMENTS

| | | | | |
|---|---|---|---|---|
| 11,257,162 B1 * | 2/2022 | Saban | .................... | G06Q 40/08 |
| 2011/0130905 A1 * | 6/2011 | Mayer | .................... | G07C 5/008 340/439 |
| 2014/0228061 A1 * | 8/2014 | Draznin | .............. | H04L 12/1895 455/466 |

(Continued)

FOREIGN PATENT DOCUMENTS

| | | |
|---|---|---|
| JP | 2008-191585 A | 8/2008 |
| JP | 2018-037002 A | 3/2018 |
| JP | 2022-138728 A | 9/2022 |

OTHER PUBLICATIONS

Definition for "Device". The Authoritative Dictionary of IEEE Standard Terms, 7th Ed., publish 2000, all pages. (Year: 2000).*

(Continued)

*Primary Examiner* — Calvin Cheung
(74) *Attorney, Agent, or Firm* — SoraIP, Inc.

(57) ABSTRACT

A driving diagnosis system includes a database, a driving diagnosis device, and a UI unit. The driving diagnosis device belongs to a diagnosis server, and UI unit belongs to a UI server. The account of the system user is separately set for each server. The diagnosis unit of the driving diagnosis device performs the driving diagnosis for each completion of 1 Trip of the vehicles based on information from the database. The aggregated data transmission unit of the driving diagnosis device transmits the aggregation result of the information of the operation diagnosis to UI servers. The result storage unit of UI unit stores the aggregation result received from the aggregated data transmission unit, and the second aggregated data transmission unit of UI unit acquires the required information from the stored aggregation result in response to a request from the system user and provides the required information to the system user.

2 Claims, 5 Drawing Sheets

(56) References Cited

U.S. PATENT DOCUMENTS

| | | | | |
|---|---|---|---|---|
| 2014/0365070 | A1* | 12/2014 | Yano | G07C 5/0808<br>701/33.4 |
| 2015/0024727 | A1* | 1/2015 | Hale-Pletka | H04W 4/44<br>455/418 |
| 2016/0039291 | A1* | 2/2016 | Reese | G07C 5/0841<br>701/29.3 |
| 2020/0334927 | A1* | 10/2020 | Rozint | B60R 21/0136 |
| 2021/0375076 | A1* | 12/2021 | Scotland | G07C 5/0825 |
| 2021/0375077 | A1* | 12/2021 | Kawahara | G07C 5/008 |
| 2022/0292885 | A1* | 9/2022 | Manabe | G07C 5/0841 |
| 2023/0083899 | A1* | 3/2023 | Gandouet | G06Q 40/08<br>705/4 |

OTHER PUBLICATIONS

Definition for "Server". The Authoritative Dictionary of IEEE Standard Terms, 7th Ed., publish 2000, all pages. (Year: 2000).*

Definition for "System". The Authoritative Dictionary of IEEE Standard Terms, 7th Ed., publish 2000, all pages. (Year: 2000).*

Definition for "Unit". The Authoritative Dictionary of IEEE Standard Terms, 7th Ed., publish 2000, all pages. (Year: 2000).*

* cited by examiner

DRIVING DIAGNOSIS SYSTEM, DIAGNOSIS SERVER, AND USER INTERFACE SERVER

CROSS-REFERENCE TO RELATED APPLICATION

This application claims priority to Japanese Patent Application No. 2023-214409 filed on Dec. 20, 2023, incorporated herein by reference in its entirety.

BACKGROUND

1. Technical Field

The present disclosure relates to a driving diagnosis system, a diagnosis server and a user interface server used for the system.

2. Description of Related Art

Conventionally, a driving diagnosis system is known that diagnoses a driving operation of a driver who drives a vehicle, and notifies the diagnosis result to a portable terminal possessed by the driver. For example, Japanese Unexamined Patent Application Publication No. 2022-138728 discloses a driving diagnosis system that includes a diagnosis result generation unit that generates a diagnosis result related to a driving operation of a vehicle, and a database unit that records the diagnosis result and is capable of being connected via the Internet.

SUMMARY

The driving diagnosis system disclosed in Japanese Unexamined Patent Application Publication No. 2022-138728 is constructed on the cloud. In this case, in view of the fact that an update of various types of functions, such as a function of a driving diagnosis, is speedily performed, it can be considered that a system is constructed by dividing a server for each of these functions. However, up to this point, technology has not been provided in which optimization of a system is performed with the viewpoint of how the type of system is to be constructed (which respective function belongs to which server).

The inventors of the present disclosure, in view of this point, have gained an insight in which it is necessary to take into consideration the following point for a relationship between various types of functions and each server. Namely, when individual servers are included in accordance with each function with numerous details, this inclusion leads to a complexity of the system configuration. Accordingly, since the management becomes complicated, and there is a possibility of a time necessary for management lengthening and leading to an inflation of cost for management, such a situation is not preferable. On the other hand, when a large number of functions belong to one server, the scale becomes large when performing a comprehensive test of the system, and it becomes difficult to perform a swift update of the functions.

The present disclosure has been made in consideration of such points, and the objective of the present disclosure is to perform optimization of a function distribution with respect to each of a plurality of servers.

A determination unit of the present disclosure for achieving the objective presupposes a driving diagnosis system that generates a driving diagnosis result calculated by using a detection value being a physical quantity to change based on at least one of traveling, steering, and braking of a vehicle or a physical quantity to change by having a prescribed operation member operated.

Also, the driving diagnosis system includes a database that accumulates information of the detection value from the vehicle, a driving diagnosis device that includes a diagnosis unit and an aggregated data transmission unit, and a user interface unit that includes a result storage unit and a second aggregated data transmission unit and receives information from the driving diagnosis device.

Moreover, the driving diagnosis device belongs to a diagnosis server, and the user interface unit belongs to a user interface server.

Moreover, an account of a system user is separately set for each of the diagnosis server and the user interface server.

Moreover, the diagnosis unit performs a driving diagnosis for each completion of 1 Trip of the vehicle based on information from the database, the aggregated data transmission unit transmits an aggregation result of information of the driving diagnosis to the user interface server.

Also, the result storage unit stores at least the aggregation result received from the aggregated data transmission unit, and the second aggregated data transmission unit, in response to a request from the system user, acquires necessary information from the stored aggregation result and provides the necessary information to the system user.

According to the specified matter, a function of a driving diagnosis based on information from the database belongs to the diagnosis server. As a result, functions of storage of an aggregation result received from the aggregated data transmission unit and provision of necessary information acquired from the aggregation result to the system user belong to the user interface server. Accordingly, optimization of a function distribution with respect to each of a plurality of servers can be performed.

Moreover, the user interface unit includes a second diagnosis unit that performs a diagnosis related to a fixed time interval recommendation, and the second aggregated data transmission unit performs aggregation and transmission of information related to the fixed time interval recommendation.

Accordingly, processing of information with an update frequency that is comparatively high (information used for a diagnosis related to a fixed time period recommendation by the second diagnosis unit) is implemented in the user interface unit. Accordingly, it becomes possible to swiftly perform update processing of the system as a whole, compared to when processing of the information is implemented in the driving diagnosis device.

Moreover, a diagnosis server used for the driving diagnosis system is also in the range of the technical idea of the present disclosure. Namely, the diagnosis server presupposes a diagnosis server used by a driving diagnosis system that generates a driving diagnosis result calculated by using a detection value being a physical quantity to change based on at least one of traveling, steering, and braking of a vehicle or a physical quantity to change by having a prescribed operation member operated.

Also, a driving diagnosis device that includes a diagnosis unit and an aggregated data transmission unit belongs to the diagnosis server, the diagnosis unit performing a driving diagnosis for each completion of 1 Trip of a vehicle based on information from a database that accumulates information of the detection value from the vehicle, and the aggregated data transmission unit transmitting an aggregation result of information of the driving diagnosis.

Moreover, the diagnosis server is able to communicate with a user interface server to which a user interface unit that includes a result storage unit and a second aggregated data transmission unit belongs, the result storage unit storing at least the aggregation result received from the aggregated data transmission unit, and the second aggregated data transmission unit, in response to a request from a system user, acquiring necessary information from the stored aggregation result and providing the necessary information to the system user.

Also, an account of the system user set in the diagnosis server is separate to an account set in the user interface server.

Accordingly, the diagnosis server has a function other than each function of storage of an aggregation result and provision of necessary information acquired from the aggregation result to the system user (functions of the user interface server). Namely, the diagnosis server has a function of a driving diagnosis based on information from the database. Accordingly, optimization of a function distribution between the diagnosis server and the user interface server can be performed.

Moreover, a user interface server used for the driving diagnosis system is also in the range of the technical idea of the present disclosure. Namely, the user interface server presupposes a user interface server used for a driving diagnosis system that generates a driving diagnosis result calculated by using a detection value being a physical quantity to change based on at least one of traveling, steering, and braking of a vehicle or a physical quantity to change by having a prescribed operation member operated.

Also, the user interface server is able to communicate with a diagnosis server to which a driving diagnosis device that includes a diagnosis unit and an aggregated data transmission unit belongs, the diagnosis unit performing a driving diagnosis for each completion of 1 Trip of a vehicle based on information from a database that accumulates information of the detection value from the vehicle, and the aggregated data transmission unit transmitting an aggregation result of information of the driving diagnosis.

Moreover, a user interface unit that includes a result storage unit and a second aggregated data transmission unit belongs to the user interface server, the result storage unit storing at least the aggregation result received from the aggregated data transmission unit, and the second aggregated data transmission unit, in response to a request from a system user, acquiring necessary information from the stored aggregation result and providing the necessary information to the system user.

Also, an account of the system user set in the user interface server is separate to an account set in the diagnosis server.

As a result, the user interface server has functions other than the function of a driving diagnosis (the function of the diagnosis server) based on the information from the database. Namely, the user interface server has functions of storage of an aggregation result and provision of necessary information acquired from the aggregation result to the system user. Accordingly, optimization of a function distribution between the diagnosis server and the user interface server can be performed.

Moreover, a driving diagnosis method implemented in the driving diagnosis system is also in the range of the technical idea of the present disclosure. Namely, the driving diagnosis method presupposes a driving diagnosis method that generates a driving diagnosis result calculated by using a detection value being a physical quantity to change based on at least one of traveling, steering, and braking of a vehicle or a physical quantity to change by having a prescribed operation member operated.

Also, the driving diagnosis method includes accumulating information of the detection value from the vehicle in a database, performing a driving diagnosis for each completion of 1 Trip of the vehicle based on information from the database by a diagnosis unit provided in a driving diagnosis device that belongs to a diagnosis server;

transmitting an aggregation result of information of the driving diagnosis by an aggregated data transmission unit provided in the driving diagnosis device;

storing at least the aggregation result received from the aggregated data transmission unit in a result storage unit that belongs to a user interface server set to a user account different to the diagnosis server and provided in a user interface unit that receives information from the driving diagnosis device, and acquiring, in response to a request from a system user, necessary information from the stored aggregation result and providing the necessary information to the system user by a second aggregated data transmission unit provided in the user interface unit.

According to the specified matter, a driving diagnosis method implemented in a driving diagnosis system can be provided in which optimization of a function distribution with respect to each of a plurality of servers is performed.

In the present disclosure, a function of a driving diagnosis based on information from the database belongs to the diagnosis server. Moreover, functions of storage of an aggregation result received from the aggregated data transmission unit of the diagnosis server and provision of necessary information acquired from the aggregation result to the system user belong to the user interface server. Accordingly, optimization of a function distribution with respect to each of a plurality of servers can be performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings.

Figure 1:
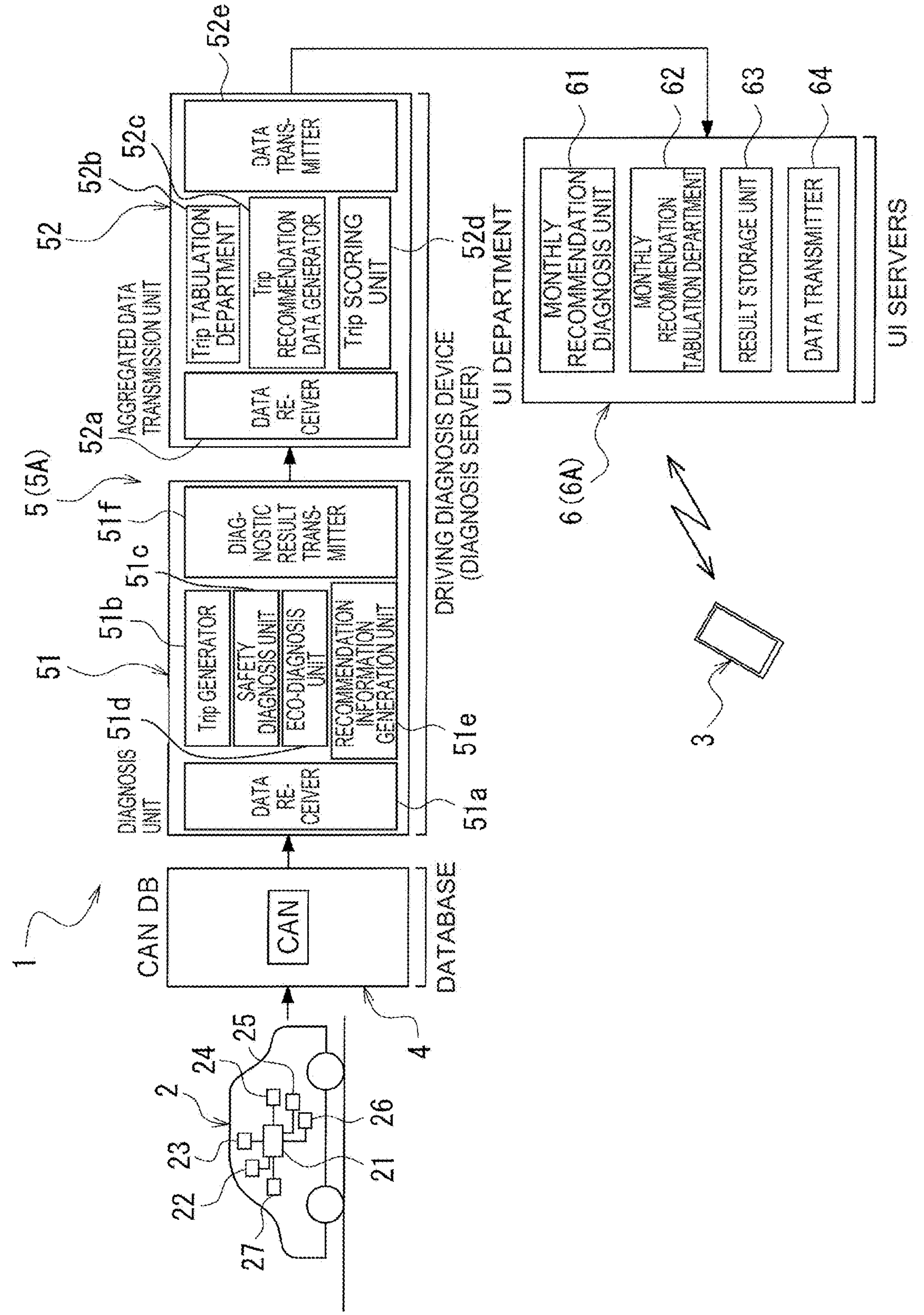
FIG. 1 is a diagram illustrating a schematic configuration of a driving diagnosis system, a vehicle, and a portable terminal according to an embodiment.

FIG. 1 is a diagram illustrating a schematic configuration of a driving diagnosis system 1 according to the present embodiment, a vehicle 2 that provides information for driving diagnosis to the driving diagnosis system 1, and a portable terminal (a portable terminal in which application software for using the driving diagnosis system 1 is installed) 3 owned by a user (a contractor) of the driving diagnosis system 1. The driving diagnosis system 1, the vehicle 2, and the portable terminal 3 are capable of data communication via a network. Although only one vehicle 2 is shown in FIG. 1, the driving diagnosis system 1 is capable of receiving information for driving diagnosis from a plurality of vehicles 2.

Configuration of the Vehicle

As shown in FIG. 1, the vehicle 2 includes an electronic control unit (ECU) 21, a wheel speed sensor 22, an accelerator operation amount sensor 23, a steering angle sensor 24, a camera 25, a global positioning system (GPS) receiver 26, and a wireless communication device 27. Vehicle ID as individual data of the vehicle 2 is given to the vehicle 2. In the present embodiment, the vehicle 2 is manufactured by a subject X (an automobile manufacturer). The sensors 22 to 24, the camera 25, GPS receiver 26, and the wireless communication device 27 are connected to ECU 21. ECU 21 includes CPU, ROM, RAM, storages, communication I/F, and input/output I/F that are communicably connected to each other via busses. The network includes a communication network of a communication carrier and an Internet network. The wireless communication device 27 of the vehicle 2 is capable of data communication with the driving diagnosis system 1 via the network.

The wheel speed sensor 22, the accelerator operation amount sensor 23, the steering angle sensor 24, and GPS receiver 26 repeatedly detect a physical quantity (the vehicle speed, the steering angle, the deceleration G, and the like) that changes based on at least one of the traveling, the steering, and the braking of the vehicle 2 or a physical quantity (the accelerator operation quantity, the brake operation quantity, the steering operation quantity, and the like) that changes when a predetermined operation member is operated, each time a predetermined time elapses. Specifically, the wheel speed sensor 22 detects the rotational speed of the wheels of the vehicle 2. The accelerator operation amount sensor 23 detects an operation amount (accelerator operation amount) of the accelerator pedal. The steering angle sensor 24 detects an operation amount (steering angle) of the steering wheel. GPS receiver 26 receives GPS signals transmitted from GPS satellites, thereby acquiring information (hereinafter, referred to as "position information") related to the position at which the vehicles 2 are traveling. The detection value detected by the sensors 22 to 24 and GPS receiver 26 are transmitted to ECU 21 via a Controller Area Network (CAN) provided in the vehicle 2 and stored in ECU 21. The camera 25 repeatedly captures an image of a subject located outside the vehicle 2 every time a predetermined time elapses. The image data acquired by the camera 25 is transmitted to ECU 21 via CAN and stored in the storage.

Detection value data, which is data representing detection values detected by the sensors 22 to 24 and GPS receiver 26, and image data acquired by the camera 25 are transmitted from the wireless communication device 27 to the database (CANDB) 4 via the network every time a predetermined period of time elapses, and are recorded in the database 4. Hereinafter, the detection value data and the image data may be collectively referred to as a detection value. All the detection value data and the image data (detection value) recorded in the database 4 are recorded in association with the information on the vehicle ID, the information on the acquired time, and the position information acquired by GPS receiver 26. The detection values transmitted from the vehicle 2 to the database 4 are not limited to those described above, and include various pieces of information that can be used for driving diagnosis. For example, the operation detection information of the operation lever of the direction indicator (so-called blinker), the operation detection information of the shift lever, and the like may be included.

Configuration of the Driving Diagnosis System

The driving diagnosis system 1 includes the database 4, a diagnosis server 5, and a user interface server (hereinafter, referred to as a UI server) 6. The database 4 and the servers 5 and 6 are arranged in a single building and connected by, for example, a local area network (LAN). That is, the driving diagnosis system 1 is constructed as a cloud computing system. In the present embodiment, the diagnosis server 5 is managed by the subject X. On the other hand, UI servers 6 are managed by the subject Y (system-managing company: for example, a subscription service provider of an automobile).

Database

As described above, the database 4 receives various detection value data and image data (information for driving diagnosis) from the vehicle 2 every time a predetermined time elapses or every time the physical quantity changes, and records the various data.

The servers 5 and 6 are configured to include CPU, ROM, RAM, storages, communication I/F, and input/output I/F.

Diagnosis Server

A driving diagnosis device 5A is constructed inside the diagnosis server 5. That is, the driving diagnosis device 5A belongs to the diagnosis server 5. The driving diagnosis device 5A includes a diagnosis unit 51 and an aggregated data transmission unit 52.

The diagnosis unit 51 includes a functional unit realized by a control program stored in a ROM of the diagnosis server 5. The functional unit includes a data reception unit 51*a*, a Trip generation unit 51*b*, a safety diagnosis unit 51*c*, an eco-diagnosis unit 51*d*, a recommendation information generation unit 51*e*, and a diagnosis result transmitting unit 51*f*.

The data reception unit 51*a* receives various detection values (detection value data and image data) accumulated in the database 4 at predetermined timings. For example, it is received every time 1 Trip (from the start switch of vehicle 2 being turned ON to being turned OFF) is completed. The timing at which the various detection values are received is not limited thereto.

The Trip generation unit 51*b* generates information (in which Trip and data are associated with each other) to which various detection values are assigned for each 1 Trip of the vehicles 2.

The safety diagnosis unit 51*c* performs diagnosis related to the safe driving of the vehicles 2. For example, diagnosis is performed for safety-related information (information related to safe driving based on the physical quantities described above) such as rapid acceleration, rapid deceleration, and rapid turning of the vehicle 2 every time 1 Trip of the vehicle 2 is completed, and the diagnosis result is outputted to the recommendation information generation unit 51*e* and the diagnosis result transmitting unit 51*f*.

The eco-diagnosis unit 51*d* performs diagnosis related to the eco-driving of the vehicles 2 (for example, the driving of reducing $CO_2$ emission). For example, information related to the eco-driving, such as the operation amount of the accelerator pedal by the driver (information related to the eco-driving based on the physical quantities described above), is diagnosed every time 1 Trip of the vehicle 2 is completed. Then, the diagnosis result is outputted to the recommendation information generation unit 51_e_ and the diagnosis result transmitting unit 51_f_.

The recommendation information generation unit 51_e_ receives information (information of a diagnosis result) from the safety diagnosis unit 51_c_ and the eco-diagnosis unit 51_d_, and generates recommendation information corresponding thereto. For example, when a diagnosis result such as a high frequency of rapid deceleration is received as a diagnosis result related to safe driving, recommendation information corresponding to the diagnosis result is generated. In addition, when a diagnosis result such as a large amount of operation per unit time of the accelerator pedal (high frequency of rapid acceleration operation) is received as a diagnosis result related to the eco-driving, the recommendation information corresponding to the diagnosis result is generated. The generated recommendation data is outputted to the diagnosis result transmitting unit 51_f_.

The diagnosis result transmitting unit 51_f_ receives the diagnosis information related to the safe driving from the safety diagnosis unit 51_c_, the diagnosis information related to the eco-driving from the eco-diagnosis unit 51_d_, and the recommendation information from the recommendation information generation unit 51_e_, and transmits the information to the aggregated data transmission unit 52.

The aggregated data transmission unit 52 includes a data reception unit 52_a_, Trip aggregation unit 52_b_, Trip recommendation information generation unit 52_c_, a Trip score generation unit 52_d_, and a data transmitting unit 52_e_ as functional units implemented by the control program.

The data reception unit 52_a_ receives diagnosis information related to safe driving, diagnosis information related to eco-driving, and recommendation information transmitted from the diagnosis result transmitting unit 51_f_.

Trip aggregation unit 52_b_ aggregates data for each Trip from each piece of information received by the data reception unit 52_a_.

Trip recommendation information generation unit 52_c_ generates recommendation information for each Trip based on the data for each Trip aggregated by Trip aggregation unit 52_b_. In other words, recommendation information useful for safe driving is generated as needed from the diagnosis information related to safe driving for each Trip, and recommendation information useful for eco-driving is generated as needed from the diagnosis information related to eco-driving for each Trip. The recommendation information is generated as information for each Trip. As an example, it is assumed that a sudden steering wheel (a situation in which the amount of change in the operation amount per unit time of the steering wheel is equal to or larger than a threshold value) at a predetermined vehicle speed or higher is diagnosed as the diagnosis information related to the safe driving. In this case, recommendation information is generated to propose the attachment of a system (called a blind spot monitor system or the like) that detects the degree of approach of another vehicle traveling in the neighboring lane and notifies the driver. In addition, it is assumed that a situation in which the switching frequency of the shift lever and the operation frequency of the steering wheel at a vehicle speed lower than or equal to the predetermined vehicle speed is equal to or higher than a threshold has occurred is diagnosed. In this case, recommendation information for proposing the installation of a system (called an advanced park system or the like) for automatically parking the vehicle 2 in the parking space is generated.

Trip score generation unit 52_d_ generates an index (score) of the driving evaluation based on the information of the diagnosis related to the safe driving for each Trip and the information of the diagnosis related to the eco-driving for each Trip. For example, a five-stage evaluation is performed as an evaluation related to safe driving and eco-driving, and the information of the evaluation in each of the safe driving and the eco-driving in each Trip is generated. As the information of the evaluation, the higher the frequency of the driving operation (the driving operation that does not cause the rapid acceleration, the rapid deceleration, and the rapid turning) that leads to the safe driving is, the higher the score is generated. Further, the higher the frequency of the driving operation (driving operation capable of reducing $CO_2$ emission) leading to the eco-driving, the higher the score is generated.

The data transmitting unit 52_e_ transmits the information received from the diagnosis unit 51 (including the information of the diagnosis result of the safety diagnosis unit 51_c_, the information of the diagnosis result of the eco-diagnosis unit 51_d_, and the recommendation information of the recommendation information generation unit 51_e_), the recommendation information for each Trip, and the information of the scores for each Trip to UI servers 6.

UI Servers

A UI unit 6A is constructed inside UI servers 6. That is, UI unit 6A belongs to UI servers 6. UI unit 6A includes a monthly recommendation diagnosis unit 61, a monthly recommendation aggregation unit 62, a result storage unit 63, and a data transmission unit 64 as functional units realized by control programs stored in a ROM of UI servers 6. The account of the system user set in UI server 6 is separate from the account set in the diagnosis server 5. That is, the account of the system user in the driving diagnosis system 1 according to the present embodiment is separately set for each of the servers 5 and 6.

The monthly recommendation diagnosis unit 61 receives the recommendation information for each Trip and the information on the scores for each Trip from the aggregated data transmission unit 52 at predetermined timings, and performs diagnosis on the recommendations for these information for one month. For example, each piece of information is accumulated from the first day of each month, and a diagnosis related to the recommendation is performed based on each piece of information received by the end of the month of the current month. For this reason, the monthly recommendation diagnosis unit 61 corresponds to the second diagnosis unit (second diagnosis unit that performs diagnosis related to the fixed time interval recommendation) referred to in the present disclosure.

The monthly recommendation aggregation unit 62 aggregates the diagnosis information calculated by the monthly recommendation diagnosis unit 61, and calculates, for example, a ratio of each type of diagnosis result. For example, in the diagnosis on the safe driving, the ratio of the number of occurrences of each of the rapid acceleration, the rapid deceleration, and the rapid turning of the vehicle 2 is calculated. The monthly recommendation information generated by the monthly recommendation aggregation unit 62 is also generated as recommendation information useful for safe driving and eco-driving as needed from the diagnostic information (information for one month) in the same way as Trip recommendation information generated by 52_c_ of Trip recommendation information generation unit described above.

The result storage unit 63 stores information (including information of a diagnosis result of the safety diagnosis unit 51_c_, information of a diagnosis result of the eco-diagnosis unit 51_d_, and recommendation information of the recommendation information generation unit 51_e_) from the aggregated data transmission unit 52, and diagnostic information tabulated by the monthly recommendation aggregation unit 62. These pieces of information are stored in the result storage unit 63 for a predetermined period of time. In addition, each piece of information stored in the result storage unit 63 may be deleted from the result storage unit 63 by an operation of the portable terminal 3 by a user of the system (hereinafter, referred to as a system user), or may be deleted by the subject Y.

In response to a request from the portable terminal 3, the data transmission unit 64 extracts information corresponding to the request from the information and transmits the information to the portable terminal 3 in response to various kinds of information (monthly recommendation information, information of each diagnosis result, and the like) stored in the result storage unit 63. Further, the portable terminal 3 may be notified of Push at a timing at which the monthly recommendation data is generated. Therefore, the monthly recommendation aggregation unit 62 and the data transmission unit 64 correspond to the second aggregated data transmission unit of the present disclosure. That is, it corresponds to a second aggregated data transmission unit that acquires necessary information from the aggregation result in response to a request from the system user and provides it to the system user, or a second aggregated data transmission unit that performs aggregation and transmission of information related to fixed time interval recommendation.

As described above, UI servers 6 according to the present embodiment handle monthly recommendations. Information about this monthly recommendation may preferably update the threshold or logic for diagnosis from the user's statistical data. It may also be preferable to change for marketing reasons. The frequency of updating the threshold value or logic is higher than that of the threshold value Fix to some extent, such as rapid acceleration or rapid deceleration. In view of this, in the present embodiment, the driving diagnosis system 1 is constructed so that UI server 6 is a server that handles information that is frequently updated. That is, since the processing of the information having a relatively high update frequency is performed in UI unit 6A belonging to UI servers 6, the speed of the update processing can be increased as compared with the case where the processing of the information is performed in the driving diagnosis device 5A.

In the present embodiment, since UI server 6 handles the information on the monthly recommendation, the diagnosis server 5 instead of UI server 6 handles the information on Trip recommendation. Therefore, when the diagnosis information and the recommendation information for each Trip are transmitted to the portable terminal 3, the information created by the diagnosis server 5 is temporarily stored in the result storage unit 63 of UI server 6. Then, in response to a request from the portable terminal 3, the portable terminal 3 is transmitted.

Transmission and Reception of Information

Next, an operation of transmitting and receiving information by the driving diagnosis system 1 according to the present embodiment will be described with reference to the sequence diagram of FIG. 2. This sequence diagram shows the transmission and reception of information between the vehicles 2, the database (CANDB) 4, the diagnosis unit 51, the aggregated data transmission unit 52, UI unit 6A, and the portable terminal 3.

Figure 2:
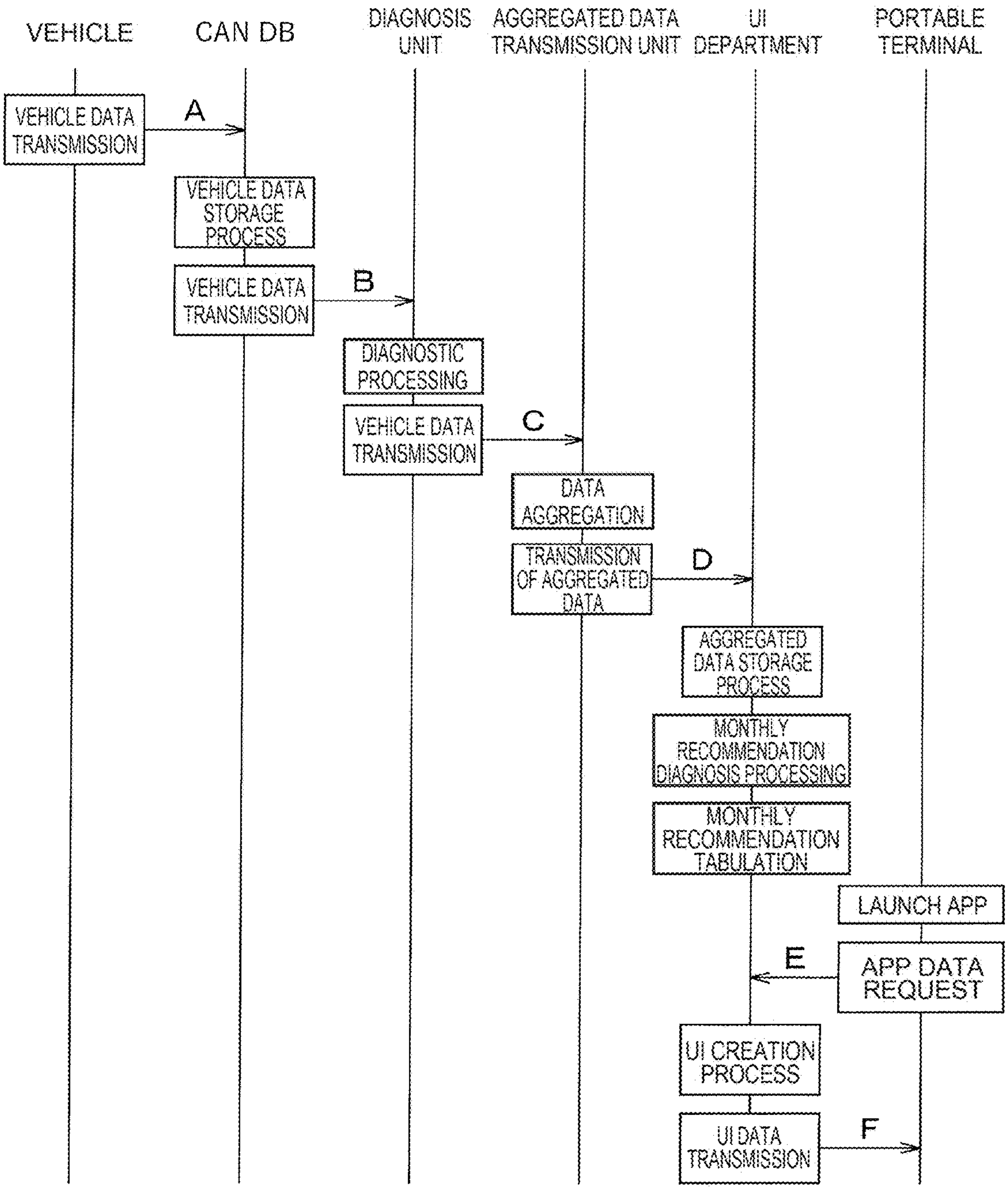
FIG. 2 is a sequence diagram for explaining an operation of transmitting and receiving information according to the embodiment.

First, vehicle data (detection value data and image data) is transmitted from the vehicle 2 to the database 4 at predetermined timings (communication operation A in FIG. 2). The vehicle data received by the database 4 is accumulated for a predetermined period (after the process of accumulating the information of the detection value from the vehicle in the database) and is transmitted to the diagnosis unit 51 at predetermined timing intervals (for example, every time 1 Trip ends) (communication operation B in FIG. 2). In the diagnosis unit 51, the above-described diagnosis processing and the like (processing in Trip generation unit 51*b*, the safety diagnosis unit 51*c*, the eco-diagnosis unit 51*d*, and the recommendation information generation unit 51*e*) is performed (in the present disclosure, a process of performing the driving diagnosis for each completion of 1 trip of the vehicles based on the information from the database), and the result information is transmitted to the aggregated data transmission unit 52 (communication operation C in FIG. 2). In the aggregated data transmission unit 52, after the totaling process of the received data (the process in Trip aggregation unit 52*b*, Trip recommendation information generation unit 52*c*, Trip score generation unit 52*d*) is performed, the totaled data is transmitted to UI unit 6A (communication operation D in FIG. 2: the process of transmitting the aggregation result of the driving diagnosis information referred to in the present disclosure).

In UI unit 6A, after the accumulation process of the aggregated data (the accumulation process for one month) is performed, the diagnosis process by the monthly recommendation diagnosis unit 61 and the aggregation process by the monthly recommendation aggregation unit 62 described above are performed. Thus, the information of the diagnosis result of the safety diagnosis unit 51*c*, the information of the diagnosis result of the eco-diagnosis unit 51*d*, the recommendation information of the recommendation information generation unit 51*e*, the monthly recommendation information, and the like are stored in the result storage unit 63 (the step of storing the aggregation result in the result storage unit).

It is assumed that a user of the system (hereinafter, referred to as a system user) operates the portable terminal 3 to activate application software installed in advance in the portable terminal 3, and performs a request operation for data transmission on the application software. Then, the request data is transmitted to UI unit 6A (communication operation E in FIG. 2). Then, in response to this, UI unit 6A creates UI data for transmission (monthly recommendation information for transmission, etc.). Then, UI data is transmitted to the portable terminal 3 (communication operation F in FIG. 2: a step of acquiring required information from the aggregation result and providing the required information to the system user). As a result, the system user can confirm the evaluation result of the vehicle driving for one month and the recommendation information regarding the upgrade of the recommended system by viewing the display screen of the portable terminal 3. In addition, the system user can confirm the diagnostic information for each Trip and the recommendation information for each Trip by operating the portable terminal 3.

In the following, an information processing sequence in each of the diagnosis unit 51, the aggregated data transmission unit 52, and UI unit 6A when an information transmission/reception operation is performed as described above will be described.

Figure 3:
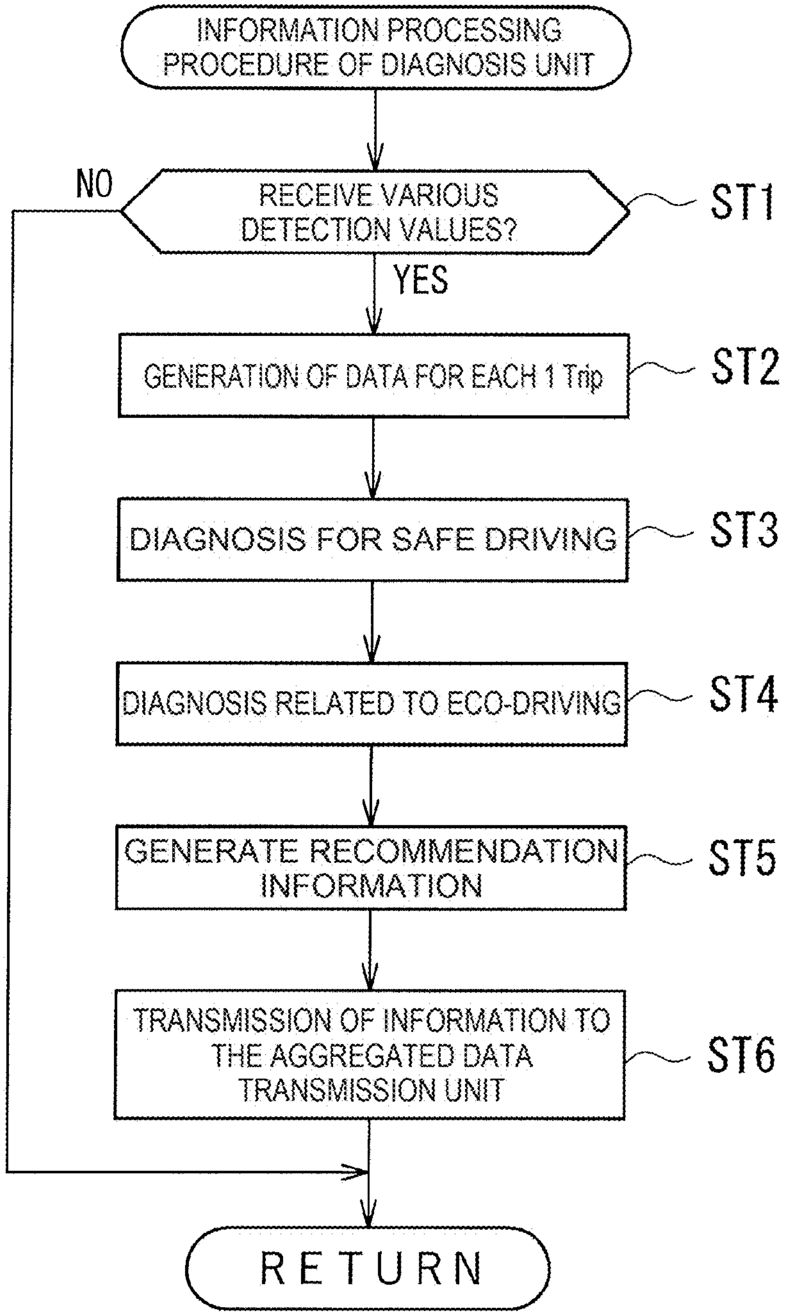
FIG. 3 is a flowchart illustrating an information processing procedure in the diagnosis unit.

FIG. 3 is a flowchart illustrating an information processing procedure in the diagnosis unit 51. First, in ST1, it is determined whether or not various detection values accumulated in the database 4 have been received. If various detection values have not been received and NO determination has been made in ST1, the process returns as it is.

When the various detection values are received and YES determined by ST1, the generation of the information to which the various detection values are assigned for each 1 Trip in ST2, the diagnosis related to the safe driving of the vehicle 2 in ST3, and the diagnosis related to the eco-driving of the vehicle 2 in ST4 are sequentially performed. Then, ST5 generates recommendation data corresponding to the diagnosis result performed by ST3, ST4. The respective pieces of information obtained in this way (diagnosis information related to safe driving, diagnosis information related to eco-driving, and recommendation information) are transmitted to the aggregated data transmission unit 52 in ST6.

Figure 4:
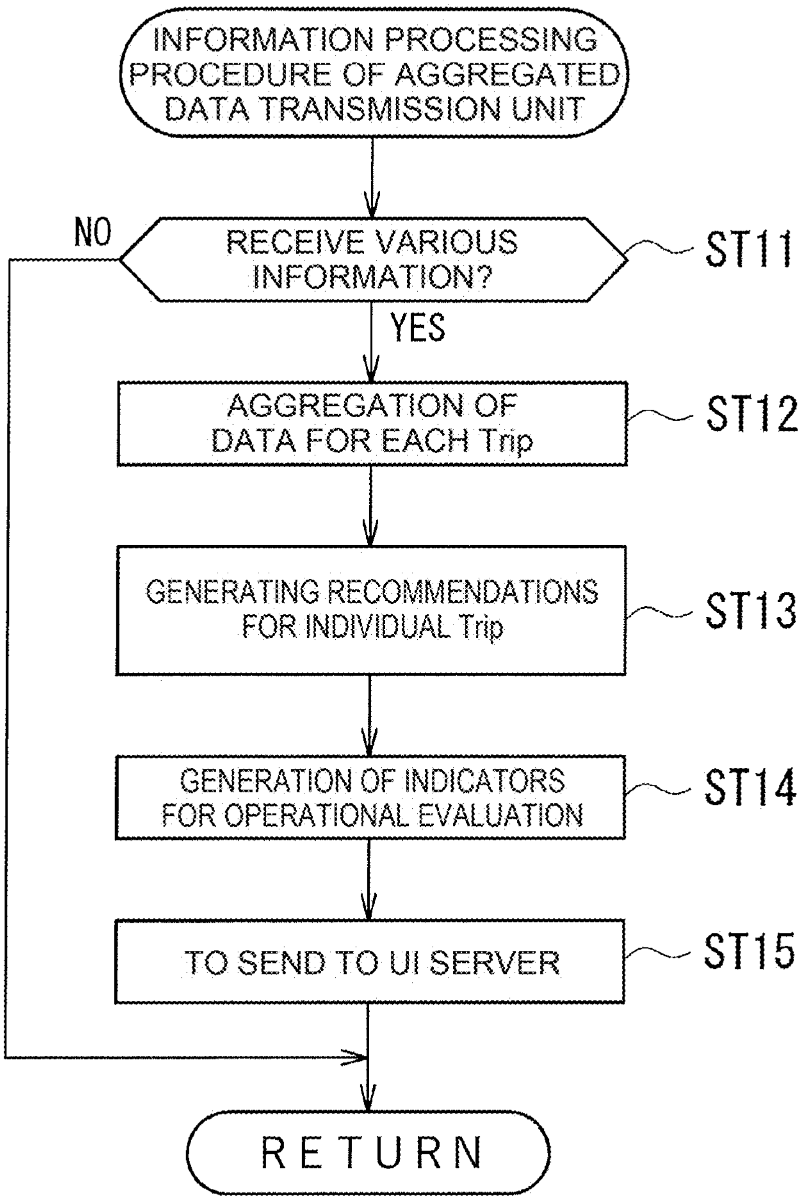
FIG. 4 is a flow chart diagram illustrating an information processing process performed by the aggregated data transmission unit.

FIG. 4 is a flowchart illustrating an information processing procedure in the aggregated data transmission unit 52. First, in ST11, it is determined whether or not various kinds of information (diagnosis information related to safe driving, diagnosis information related to eco-driving, and recommendation information) have been received. If various types of data are not received and NO determination is made in ST11, the process returns as it is. When various kinds of information are received and YES determination is made in ST11, data is aggregated for each Trip in ST12, recommendation information for each Trip in ST13 is generated, and an index for operation assessment in ST14 is generated in this order. Then, in ST15, the received information (the information on the diagnosis result, the recommendation information, the recommendation information for each Trip, and the information on the scoring for each Trip) is transmitted to UI servers 6.

Figure 5:
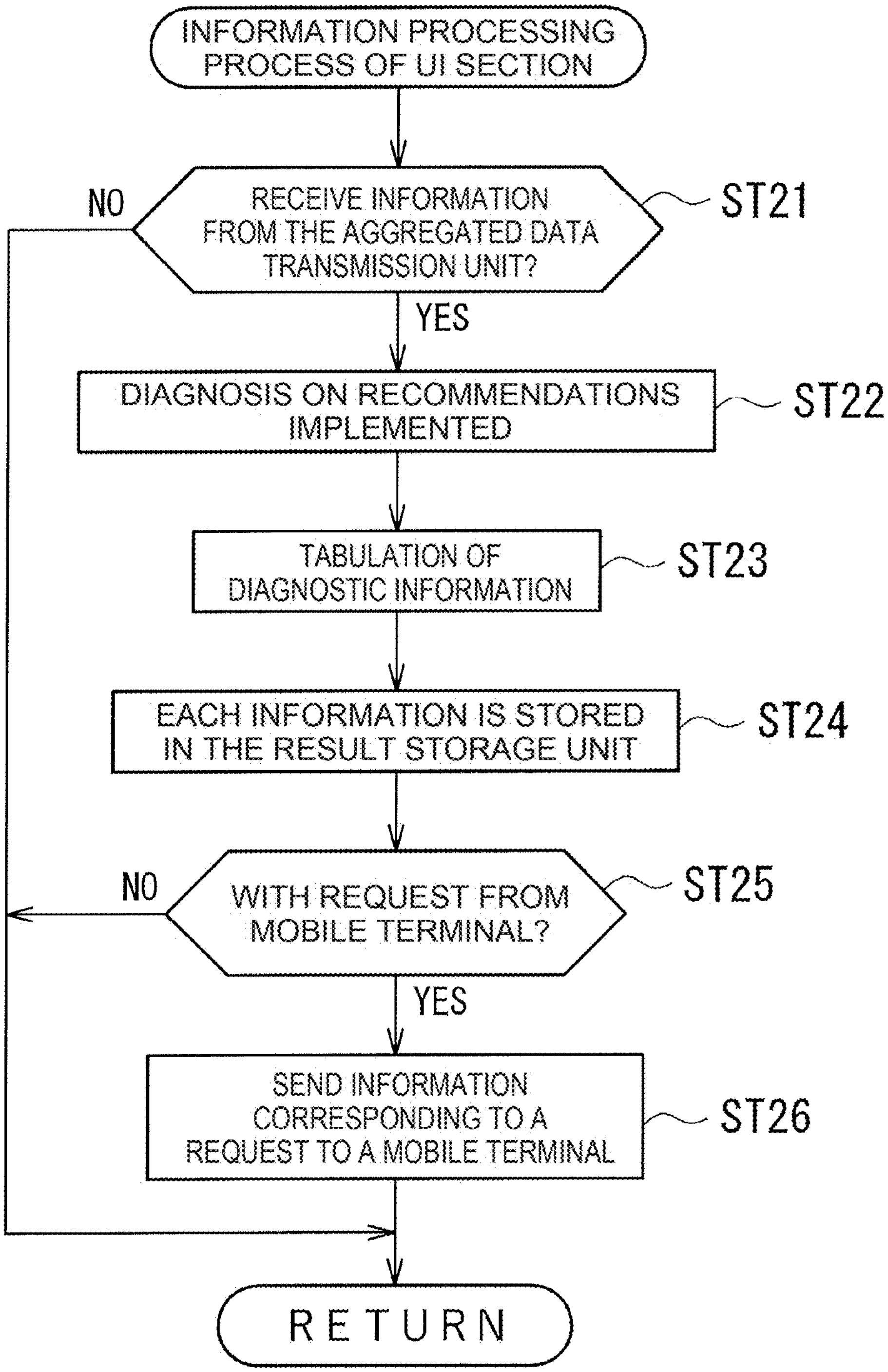
FIG. 5 is a flowchart illustrating an information processing procedure in the user interface unit.

FIG. 5 is a flow chart illustrating an information processing process in UI unit 6A. First, in ST21, it is determined whether or not recommendation information for each Trip, information on scoring for each Trip, and the like have been received from the aggregated data transmission unit 52. When these data are not received and NO determination is made in ST21, the data is returned as it is. If the information is received and YES determined in ST21, ST22 diagnoses the recommendations for the information over a one-month period. In addition, this diagnostic data is tabulated in ST23. In ST24, the respective pieces of information (information of the diagnosis result, recommendation information, and the like) are stored in the result storage unit 63.

Then, in ST25, it is determined whether or not there is a request from the portable terminal 3. If there is no request from the portable terminal 3 and NO determination is made in ST25, the process returns as it is. On the other hand, if there is a request from the portable terminal 3 and a YES determination is made in ST25, the process proceeds to ST26, where information corresponding to the request is extracted from the information stored in the result storage unit 63 and transmitted to the portable terminal 3.

Effects of Embodiment

As described above, in the present embodiment, the function of the driving diagnosis based on the information from the database 4 belongs to the diagnosis server 5. UI servers 6 are configured to store the aggregation results received from the aggregated data transmission unit 52 and provide the required information obtained from the aggregation results to the system users. Therefore, it is possible to prevent complication of the system configuration caused by the provision of individual servers according to each of a large number of fine functions, and to prevent complication of management, prolongation of time required for management, and increase in cost for management. In addition, it is possible to suppress an increase in the scale of the overall test of the system due to the fact that a large number of functions belong to one server, and it is possible to promptly update the functions. As a result, it is possible to optimize the function distribution for each of the plurality of servers 5 and 6.

In addition, UI unit 6A performs a process of information that is relatively frequently updated, which is information used for the diagnosis regarding the monthly recommendation by the monthly recommendation diagnosis unit 61. As a result, it is possible to quickly perform the update processing on the entire system as compared with the case where the processing of this information is performed in the driving diagnosis device 5A, and it is possible to optimize the servers that handle the information with a higher frequency of update. As a result, it is possible to quickly update the system in accordance with the needs of the system user, and it is possible to easily update the system in a case where it is desired to provide the recommendation information to many system users for marketing reasons or the like.

Further, in the present embodiment, UI server 6 is provided with the result storage unit 63, which is advantageous from the viewpoint of cost/security for accessing the external server each time the aggregated data is processed. In addition, since UI server 6 is provided with a browsing log or the like of the system user, it is possible to easily use information required for improving UI server 6.

Other Embodiments

It should be noted that the present disclosure is not limited to the above-described embodiments, and all modifications and applications can be made within the scope of the claims and the scope of equivalents thereof.

For example, the diagnosis items to be placed on UI unit 6A may be the results of the diagnosis based on statistics such as the ranking (the ranking in the safe driving, etc.) and the deviation value among the plurality of users using the driving diagnosis system 1, or the map information. That is, it may be a diagnosis result or the like combined with information other than the information acquired from only one vehicle 2 used by the user.

Further, the diagnosis result information and the recommendation information may be confirmed not only on the portable terminal 3 but also on Web page.

In addition, in the above-described embodiment, both the information for each Trip and the information for the month are provided to the system user. The present disclosure is not limited to this, and only one of these pieces of information may be provided to the system user.

The present disclosure is applicable to a driving diagnosis system, a diagnosis server, a user interface server, and a driving diagnosis method that diagnose a driving operation of a driver and notify a portable terminal owned by the driver of a diagnosis result.

What is claimed is:

1. A driving diagnosis system configured to generate a driving diagnosis result of a vehicle, the driving diagnosis system comprising:

- a vehicle including a sensor and a vehicle processor, the sensor being configured to acquire vehicle information indicating a physical quantity that changes based on at least one of traveling, steering, and braking of the vehicle;
- a database including a database memory and configured to store the vehicle information acquired by the sensor;
- a diagnosis server including a first processor and a first memory;

a user interface (UI) server including a second processor and a second memory; and a portable terminal including a terminal processor and a terminal display, wherein:

an account of a system user is separately set for each of the diagnosis server and the user interface server;

the vehicle processor is configured to transmit the vehicle information acquired by the sensor to the database memory;

the database memory is configured to store the vehicle information acquired by the sensor;

the first processor is configured to acquire the vehicle information from the database memory at predetermined timings, perform a driving diagnosis for each completion of 1 Trip of the vehicle based on the vehicle information, generate an aggregation result of the driving diagnosis, generate recommendation information based on the aggregation result of the driving diagnosis, and transmit the aggregation result of the driving diagnosis and the recommendation information to the second processor;

the second processor is configured to accumulate, in the second memory, the aggregation result of the driving diagnosis received from the first processor for a predetermined period, and aggregate recommendation information related to a fixed time interval recommendation;

the terminal processor is configured to send, to the second processor, a request for transmitting information of the aggregation result of the driving diagnosis; and the second processor is further configured to in response to receiving the request from the terminal processor, send the information of the aggregation result and the recommendation information related to the fixed time interval recommendation to the terminal processor.

2. The driving diagnosis system according to claim 1, wherein the sensor includes a speed sensor configured to acquire speed information indicating speed of the vehicle, and a steering sensor configured to acquire steering information indicating operation of a steering wheel of the vehicle;

the first processor is configured to determine, based on the information acquired by the sensor, whether an operation frequency of the steering wheel at a vehicle speed lower than or equal to a predetermined vehicle speed is equal to or higher than a threshold, as the driving diagnosis, in a case where the operation frequency of the steering wheel at the vehicle speed lower than or equal to the predetermined vehicle speed is equal to or higher than the threshold, generate the recommendation information to propose installing a blind spot monitor system to the vehicle, and transmit the recommendation information to the second processor;

the second processor is further configured to accumulate, in the second memory, the recommendation information received from the first processor for one month, generate monthly recommendation information based on the accumulated recommendation information, and send the monthly recommendation information to the terminal processor; and in response to receiving the monthly recommendation information from the second processor, the terminal processor is configured to display the monthly recommendation information on the terminal display.

* * * * *